United States Patent [19]

Ikari et al.

[11] Patent Number: 4,487,493
[45] Date of Patent: Dec. 11, 1984

[54] ELECTROMAGNETICALLY DRIVEN SHUTTER

[75] Inventors: Hideo Ikari; Michio Hirohata, both of Tokyo, Japan

[73] Assignee: Canon Kabushiki Kaisha, Tokyo, Japan

[21] Appl. No.: 596,569

[22] Filed: Apr. 4, 1984

Related U.S. Application Data

[63] Continuation of Ser. No. 402,601, Jul. 28, 1982, abandoned.

[30] Foreign Application Priority Data

Aug. 3, 1981 [JP] Japan .............................. 56-121571
Aug. 5, 1981 [JP] Japan .............................. 56-122616
Aug. 7, 1981 [JP] Japan .............................. 56-124539

[51] Int. Cl.³ .............................................. G03B 9/08
[52] U.S. Cl. ............................... 354/234.1; 354/230
[58] Field of Search ............ 354/234, 271, 230, 234.1,
354/271.1; 310/27, 36–39, 264, 268, DIG. 6;
335/219, 222, 223, 225, 269, 279; 324/150;
336/225, 227, 232

[56] References Cited

U.S. PATENT DOCUMENTS

| | | | |
|---|---|---|---|
| 3,430,119 | 2/1969 | Shelley | 310/36 |
| 4,333,722 | 6/1982 | Lee | 354/234 |
| 4,349,264 | 9/1982 | Tezuka et al. | 354/234 |

*Primary Examiner*—William B. Perkey
*Attorney, Agent, or Firm*—Toren, McGeady and Stanger

[57] ABSTRACT

An electromagnetically driven shutter includes combined diaphragm-shutter blades, the opening and closing of which is controlled by a swingable coil arranged in magnetic fields to travel forwards and backwards. The turns of the coil are made eccentric in relation to the swinging center of the coil, and a drive member for transmitting motion of the coil to the shutter blades is located with its center of inertia at a point almost opposite in position, relative to the swinging center of the coil, from the position of the center of inertia of the coil.

9 Claims, 16 Drawing Figures

ELECTROMAGNETICALLY DRIVEN SHUTTER

This is a continuation of application Ser. No. 402,601, filed July 28, 1982, now abandoned.

BACKGROUND OF THE INVENTION

1. Field of the Invention

This invention relates to electromagnetically driven shutters, and more particularly to electromagnetically driven shutters having diaphragm-cum-shutter blades of which the opening and closing operation is controlled by a coil arranged to travel forwards and backwards in magnetic fields.

2. Description of the Prior Art

Figure 1A:
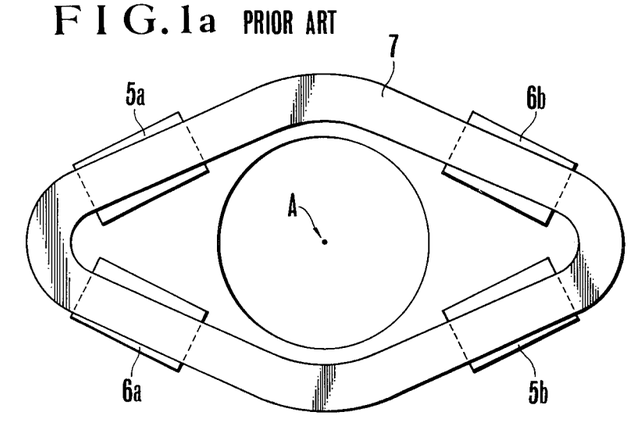
FIGS. 1a and 1b are schematic plan views illustrating the main parts of the conventional electromagnetically driven shutters.
Figure 1B:
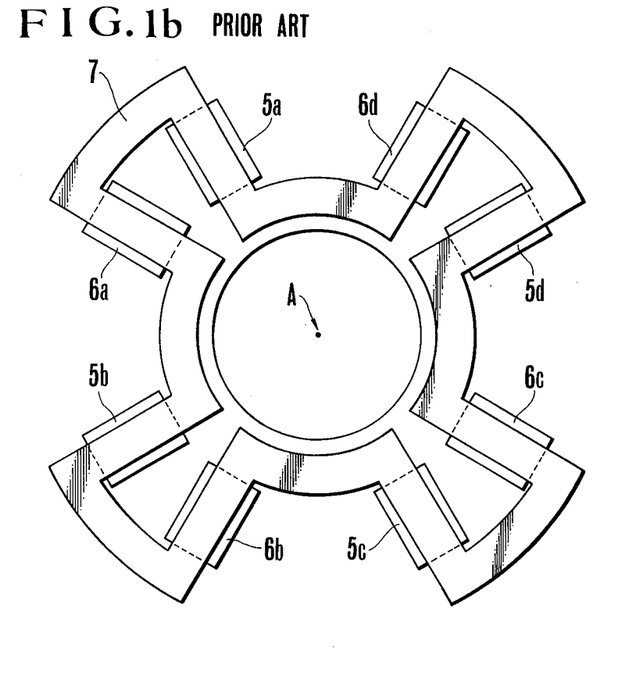

In the past, the electromagnetically driven shutters have been constructed in such form as, for example, illustrated in FIGS. 1a and 1b, wherein the optical axis of the objective lens is used as a center A of rotation of a coil 7, and the wire of coil 7 is wound symmetrically with respect to this rotation center A. This has the advantages that, as the center of inertia of the coil 7 coincides with the center of rotation A thereof, any variation of the speed of forward and backward movement of the coil 7 depending on variation of the attitude of the shutter can be avoided, and the operation of winding turns of the coil 7 becomes easy. However, such form has the problem that the coil 7 is necessarily shaped to a large bulk and size.

Under this circumstance, when the coil 7 is given a constant electrical resistance, the number of turns of the coil 7 must be lessened with the result that the number of wire components which lie across the magnetic field formed by one magnet is reduced. Therefore it has been impossible to achieve a much-desired increase in the magnitude of electromagnetic force exerted on the coil 7 by one magnet. In more detail, letting F denote the electromagnetic force, B the strength of the magnetic field formed by the magnet, I the current flowing through the coil 7 and L the length of that part of the coil 7 which lies in the magnetic field, we have the electromagnetic force expressed as follows:

$$F = BIL \tag{1}$$

It is evident from this equation that as the number of turns of the coil 7 decreases and the length of that part of the coil 7 which passes across each magnetic field shortens, the magnitude of electromagnetic force F is decreased.

In the conventional electromagnetically driven shutters, therefore, it has been required to employ a rather large number of precious magnet pieces (5a-5d, 6a-6d) than is usually expected as illustrated in FIGS. 1a and 1b (four pieces in FIG. 1a and eight pieces in FIG. 1b), thereby giving a disadvantage from the economical standpoint.

SUMMARY OF THE INVENTION

With the forgoing in mind, it is an object of the present invention to provide an electromagnetically driven shutter which achieves the possibility of increasing the number of turns of a coil with increase in the electromagnetic force per magnet, and in which the action of a drive member is not varied by the attitude of the shutter.

This and other objects of the present invention will become apparent from the following description of embodiments thereof.

DETAILED DESCRIPTION OF THE PREFERRED EMBODIMENTS

The present invention will next be described in greater detail in connection with embodiments thereof by reference to the drawings.

Figure 2:
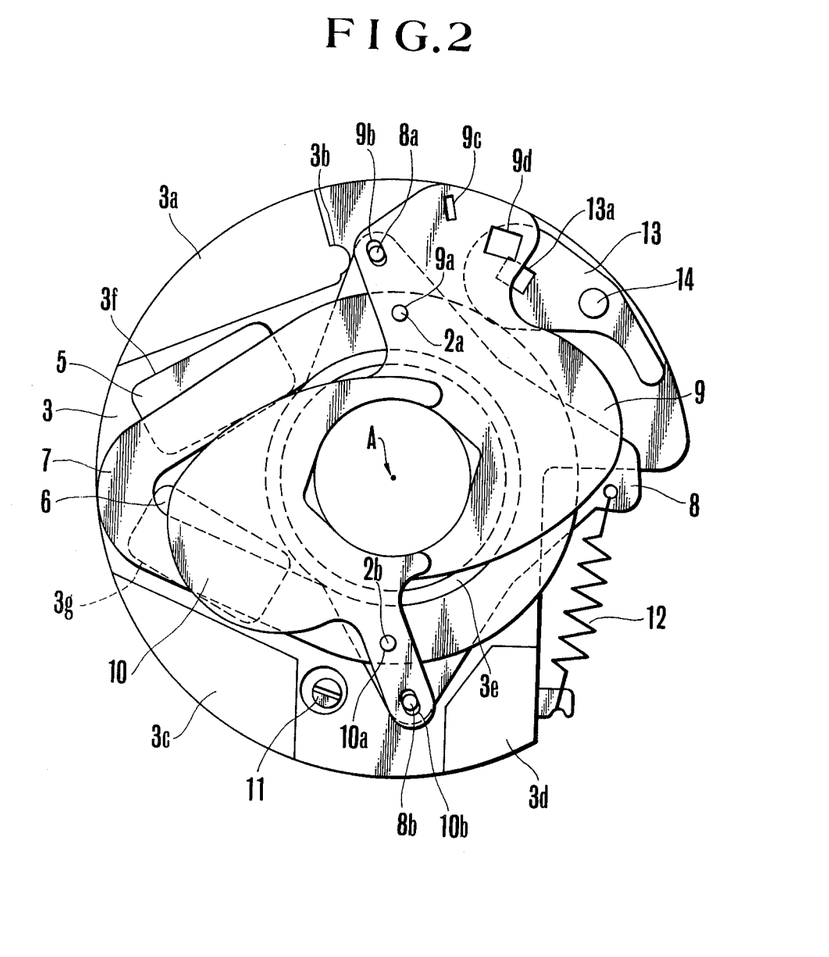
FIG. 2 is an elevational view of an embodiment of an electromagnetically driven shutter according to the present invention.
Figure 3:
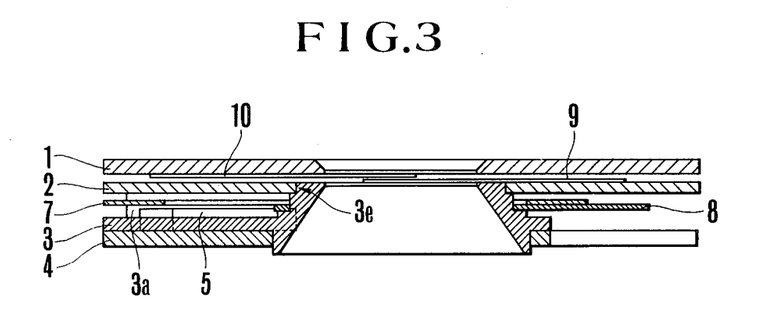
FIG. 3 is a sectional view of the shutter of FIG. 2.
Figure 4:
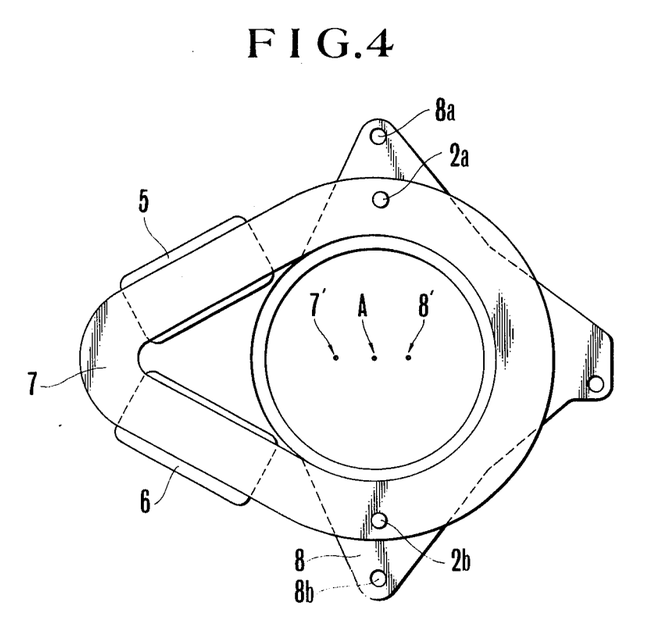
FIG. 4 is an elevational view illustrating the essential parts of FIG. 2 embodiment.

FIGS. 2, 3 and 4 show a shutter base plate 1; yokes 2 and 4 forming part of a magnetic circuit; a holder 3 made of non-magnetic material, said holder 3 being provided with holes 3f and 3g for holding magnets 5 and 6 and being pressed against the yoke 2 at portions 3a, 3c, 3d and 3e to form a gap. The magnets 5 and 6 are magnetized in axial directions, and oriented so that the S pole of the magnet 5 faces a sector ring to be described later, and the N pole of the magnet 6 faces the sector ring. A coil 7 crosses magnetic fields formed by the magnets 5 and 6 at two sites on only one side of an axis passing through the rotation center A (a point in the optical axis) and lying in a plane of rotation so that the length of one turn is shortened to permit an increase of the number of turns for a given constant electrical resistance, thus making longer the length of that part of the coil 7 which crosses the magnetic fields and strengthening the electromagnetic force exerted per magnet. Since the wire of said coil 7 is wound eccentrically to the rotation center A, the center of inertia 7' is shifted toward the magnetic field side of the rotation center A. A sector ring 8 rotatable about the rotation center A is fixed to the coil 7, these two parts forming a rotary member. Said ring 8 is so configured that a center of inertia 8' lies on the opposite side of the rotation center A from the center 7' of inertia of the coil 7, for the purpose of stabilizing rotational motion of the rotary member. Shutter blades 9 and 10 also serve as diaphragm blades, the blades 9 having a hole 9a fitted on a pivot shaft 2a which is supported on the yoke 2, and a slot 9b through which a drive pin 8a supported on the sector ring 8 extends, so that as the sector ring 8 rotates, the blade 9 pivots about the shaft 2a. Auxiliary diaphragm aperture openings 9c and 9d for light measurement are arranged so that as the blade 9 opens and closes, the size of opening of a light measuring aperture 13a is controlled so that the amount of light received by a photo-sensitive element (not shown) is made to correspond to the exposure of a photographic film (not shown). Again, the light measuring diaphragm openings 9c and 9d are positioned opposite to the eccentric side of the coil 7 thereby giving an advantage that an unbalance of weight due to eccentricity of the coil 7 is compensated for by the weight of its neighboring portions. The shutter blade 10 has a hole 10a fitted on a pivot shaft 2b, and a slot 10b through which a drive pin 8b extends so that similarly to the blade 9, as the sector ring 8 rotates, the blade 10 pivots about the shaft 2b. An eccentric pin 11 adjusts the time that the blades 9 and 10 start to open. A spring 12 urges the sector ring 8 in a clockwise direction. This spring 12 is connected to the sector ring 8 at the opposite position to the eccentric side of the coil 7 so that the influence of the equivalent weight of the spring 12 on the sector ring 8 is produced on the oppositive side to the eccentric side of the coil 7, thus contributing to a good balance of the rotary member as a whole. An auxiliary diaphragm blade 13 having the light measuring aperture 13a, is pivotally mounted at a pin 14 so that the timing of light measurement is adjustable.

The operation of the electromagnetically driven shutter of FIGS. 2 and 4 is as follows:

Now assuming that current from a battery (not shown) is supplied to the coil 7 in a counterclockwise direction, then an electromagnetic force of counterclockwise direction is exerted on the coil perpendicular to the magnetic fields formed by the maagnets 5 and 6. Accordingly, the sector ring 8 which has so far been held stationary in engagement with the adjusting pin 11 by the spring 12, is turned in the counterclockwise direction. Such motion is transmitted through the drive pins 8a and 8b on the sector ring 8 to turn the blades 9 and 10 about the respective pivot pins 22a and 2b in the counterclockwise direction. Thus, the shutter blades 9 and 10 open to initiate an exposure.

In order to close the shutter blades 9 and 10, the current supply to the coil 7 is cut off so that the electromagnetic force disappears. Then the sector ring 8 turns in the clockwise direction under the action of the spring 12, wherein the shutter blades 9 and 10 are turned about the pivot pins 2a and 2b in the clockwise direction to close the exposure aperture. Since the coil 7 and the sector ring 8 are combined to form the rotary member in such a way that the center of inertia of the coil 7 and the center of inertia of sector ring 8 are opposite to each other with respect to the center of rotation A, as stated above, the center of inertia of the rotary member as a whole comes into almost coincidence with the center of rotation A. For this reason, despite the use of the eccentric coil, stabilization of rotational motion is secured.

It is to be noted in connection with the aforesaid embodiment that the coil 7 is made of a self-adhesive, or the coil 7 is solidified by using an adhesive agent, so as to permit that part of the rotary member which crosses the magnetic field to be formed by the coil, along with the advantage that the void in the magnetic circuit is decreased with increase in the electromagnetic force.

It is also to be noted that instead of using a solidified coil as in the foregoing embodiment, it is of course possible to use an ordinary coil, provided that every turn of the coil is fixed to the sector ring (in this case the sector ring is larger in size than that in the foregoing embodiment). In order to place the inertia center of the sector ring on the opposite side of the inertia center of the coil, a counter-balance is used as positioned on the sector ring at an opposite point relative to the rotation center of the rotary member from the center of inertia of the coil.

Figure 5:
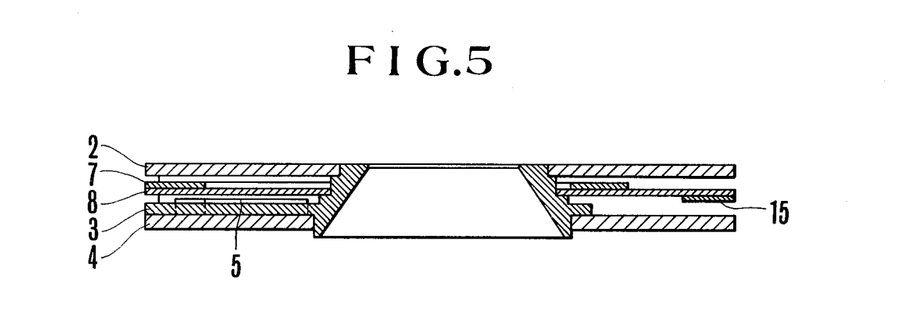
FIG. 5 is a sectional view of another embodiment of the present invention.

FIG. 5 in a sectional view illustrates the main parts of another embodiment of the electromagnetically driven shutter according to the present invention, where the same reference characters have been employed to denote the parts similar to those shown in FIGS. 2 to 4. This embodiment differs from the foregoing in that, as has been stated just above, the sector ring 8 is configured so as to cover the entire area of the coil 7 and the coil 7 is fixed to the sector ring 8. And, as illustrated in FIG. 5, a balance weight 15 is provided on the opposite side of the rotation center A from the center of inertia of the coil 7.

Figure 6:
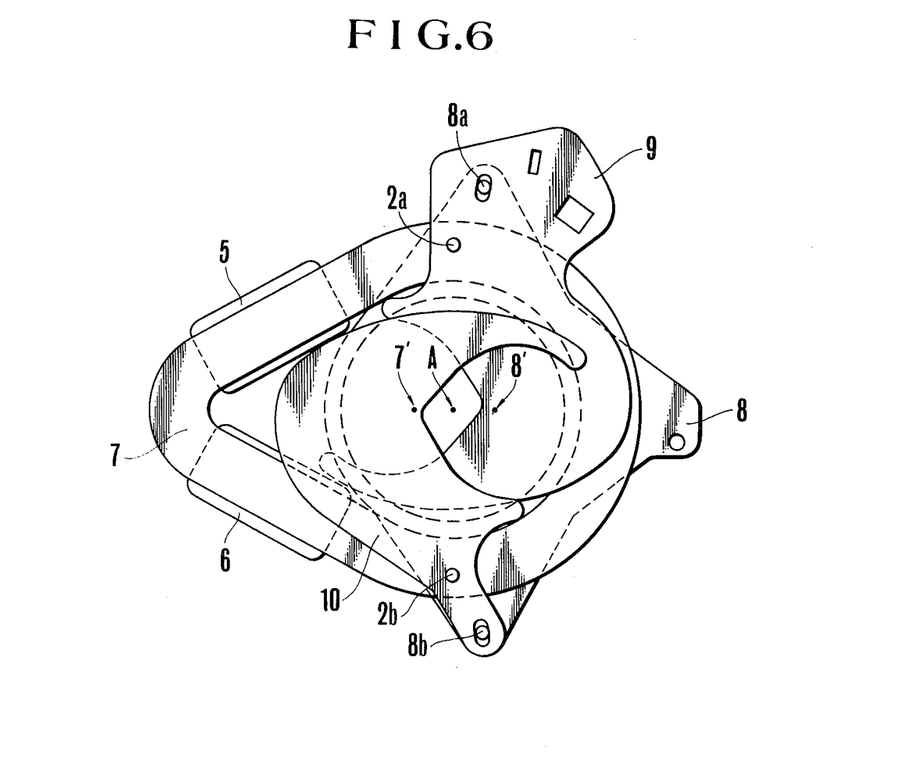
FIG. 6 is an elevational view of still another embodiment of the present invention.

FIG. 6 in an elevational view illustrates still another embodiment of the present invention where the same reference characters have been employed to denote parts similar to those shown in FIGS. 2 to 4. In this embodiment, the shutter drive pins 8a and 8b are positioned on the opposite side of the rotation center of the rotary member from the inertia center 7' of the coil 7, so that it is easy to arrange the shape of the sector ring 8 in balance with the coil 7. In other words, by locating the drive pins 8a and 8b on the opposite side of the rotation center A from the eccentric side of the coil 7, even the weights of the pins 8a and 8b can be used for correction of balance.

Figure 7:
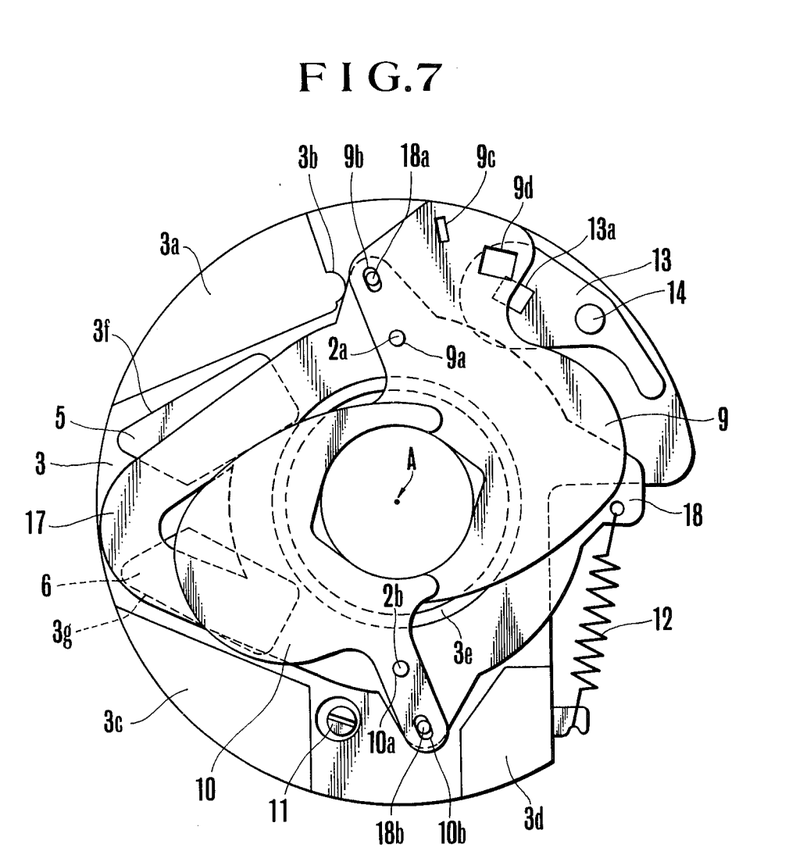
FIG. 7 is an elevational view of a further embodiment of the present invention.
Figure 8:
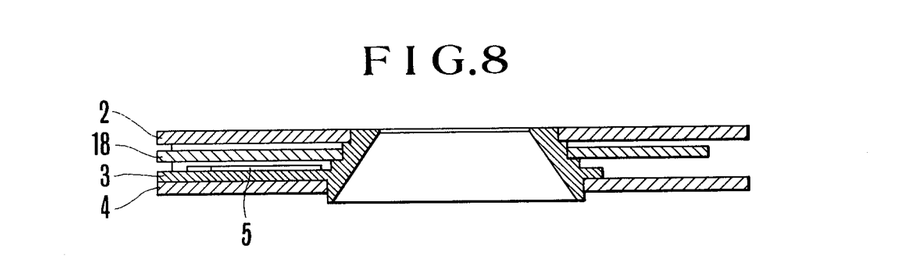
FIG. 8 is a sectional view of the shutter of FIG. 7.
Figure 9:
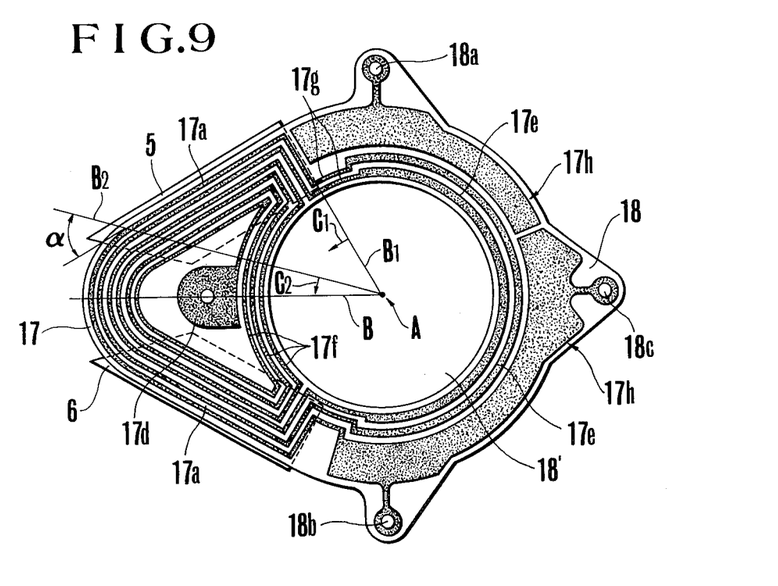
FIG. 9 is a plan view of the essential parts of FIG. 7 embodiment.

Next, FIG. 7, FIG. 8 and FIG. 9 illustrate a further embodiment of the invention where a coil-printed plate is used as a sector ring and where the same reference characters have been employed to denote parts similar to those shown in the foregoing embodiments. The drawings show a yoke 2 (shown in FIG. 8), and a printed plate 18 serving as a sector ring, the printed plate 18 having an exposure aperture 18'. The printed plate 18 has a coil 17 printed on either surface thereof and arranged so that the direction of current flow in the coil on one surface is the same as in another coil on the opposite surface. Again, said printed plate is arranged to be rotatable about the optical axis as the center of rotation A, and is formed to an almost symmetric shape with respect to a line B passing through the rotation center A as illustrated in FIG. 9. Also on this line B there is a hole 18c in which one end of a spring 12, to be described later, is hooked. The turns of the coil 17 printed on the plate 18 take such form, as illustrated in FIG. 9, that the eccentricity is shifted to one side of the optical axis A, or an almost triangular form, aiming at an advantage that the length of the coil is shortened with increase in the number of turns under the condition of a constant electrical resistance. For this reason, the electromagnetic force exerted on that part 17a of the coil which lies in the magnetic field is increased. In alignment with the part 17a of the coil, there are arranged magnets 5 and 6 to form magnetic fields of axial direction for normally crossing said coil part 17a.

Of the effective turns on the part 17a of the coil which cross the magnetic fields, a portion near the rotation center A of the printed plate 18 is oriented in parallel to a radius B1 passing through the rotation center A, and a portion farther from the rotation center A is oriented so that each turn makes a smaller angle with a radius B2. Accordingly, that component C2 of the electromagnetic force exerted on the coil 17 which is perpendicular to the radius B2, or which is effective to rotatably drive the printed plate 18, can take as large a value as possible.

There are further provided arcuate electrically conductive paths 17e connecting the right and left halves 17a of each of some turns of the coil with each other, and having widths which are wider in proportion to the rspective lengths of the paths from those of each of the paths 17f connecting the right and left halves 17a of the remaining turns of the coil 17. This reduces the electrical resistance of the paths 17e. Furthermore, the boundary portions 17g between the turns 17a and the paths 17e are narrower in width as compared with the paths 17e for the purpose of elongating the length of that part of the coil which runs parallel to the radius B1.

A holder 3 is provided with holes 3f and 3g in which the magnets 5 and 6 are seated, and with abutment portions 3a, 3c, 3d and 3e in pressing contact with the yoke 2 to create a gap therebetween. The magnets 5 and 6 are magnetized axially and oriented with S and N poles thereof respectively facing at the printed plate. Said magnets 5 and 6 form magnetic fields of axial direction, perpendicularly crossing the turns in the part 17a of the coil 17, and are configured in trapezoid shapes which are symmetric to each other so that when the magnets are placed in respective holes 3f and 3g on the assembly line, there is no need to check whether or not the polarity is correctly oriented, thus improving the efficiency of operation.

An auxiliary diaphragm blade 13 has a window 13a for light measurement and is pivotally mounted on a shaft 14 so that the timing of light measurement can be adjusted. Also shown are diaphragm-cum-shutter blades 9 and 10. The blade 9 is fitted at a hole 9a on a pivot shaft 2a which is supported on the yoke 1, and engages at a hole 9b with a drive pin 18a supported on the printed plate 18 to turn about the pivot shaft 2a as the printed plate 18 turns. Holes 9c and 9d for light measurement cooperate with the auxiliary diaphragm. The blade 10 is fitted at a hole 10a on a pivot shaft 2b which is supported on the yoke 2, and engages at a hole 10b with a drive pin 18b so that similarly to the aforesaid blade 9, as the printed plate 18 turns, the blade 10 turns about the pivot shaft 2b. An eccentric pin 11 adjusts the time that the blades start to open. A spring 12 urges the printed plate 18 in a clockwise direction.

It is to be noted that this embodiment is basically similar to the embodiments previously described in that the center of inertia of the printed coil 17 and center of inertia of the printed plate 18 are positioned on opposite sides of the rotation center A.

It is also to be noted that in this embodiment, on the opposite side of the coil portion 17a, there is left a certain amount of copper foil 17h to compensate for unbalance.

The operation of the electromagnetically driven shutter of FIGS. 7 and 8 is as follows:

When the coil 17 is energized by current flowing from an electrical power source (not shown) in the counterclockwise direction, an electromagnetic force is produced acting on the turns of part 17a of the coil in the counterclockwise direction, as the turns cross perpendicularly the magnetic fields formed by the magnets 5 and 6. The printed plate 18 thus is driven to turn from a position where it abuts on the adjusting pin 11 under the action of the spring 12 in the counterclockwise direction. Such motion is transmitted through the drive pins 18a to turn the blades 9 and 10 about the pivot pins 2a and 2b respectively in the counterclockwise direction, and the blades 9 and 10 open to initiate an exposure.

Then when the coil is de-energized, the electromagnetic force disappears. Then the printed plate 18 is driven by the spring 12 to turn in the clockwise direction, so that the shutter blades 9 and 10 are turned about the pivot shafts 2a and 2b in the clockwise direction, thus terminating the exposure.

Figure 10:
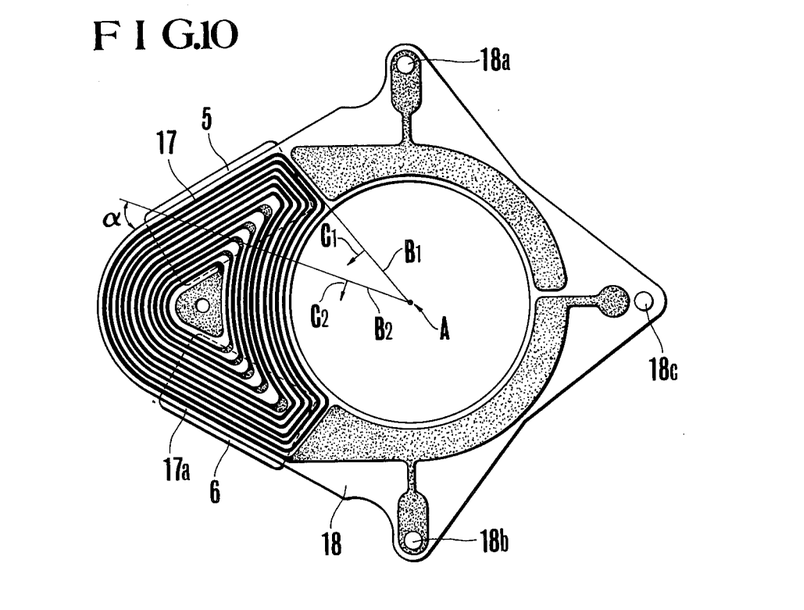
FIG. 10 is a plan view of another example of the parts of FIG. 9.
Figure 11A:
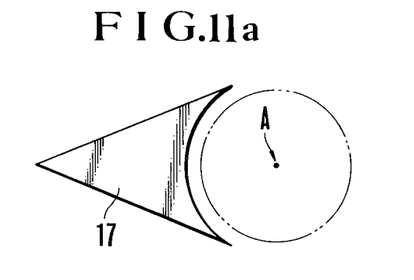
FIGS. 11a to 11e are schematic plan views of examples of the shutter coil shape.
Figure 11B:
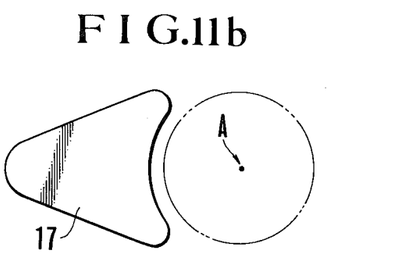
Figure 11C:
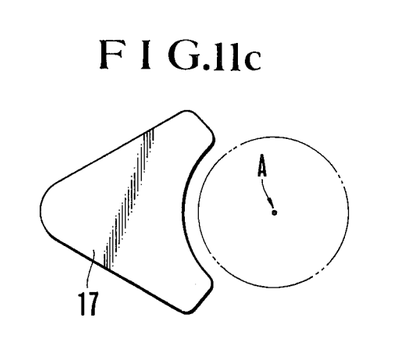
Figure 11D:
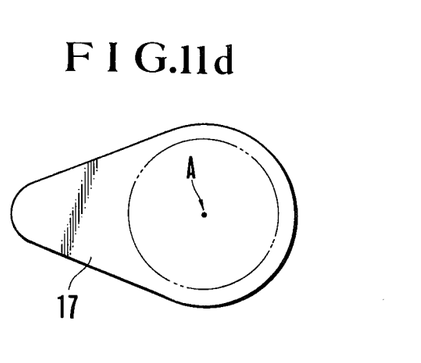
Figure 11E:
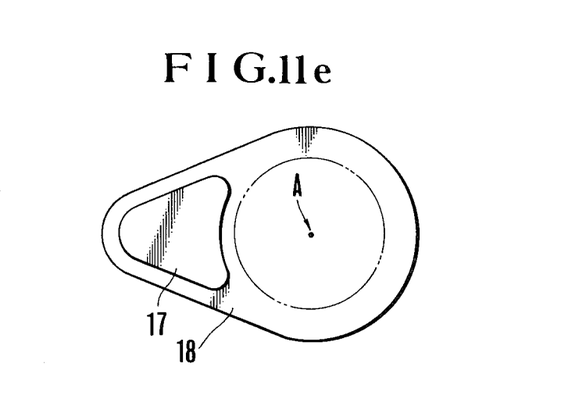

FIG. 10 illustrates another practical example of the printed plate 18 in which the printed coil 17 is constructed with turning coil part 17a only, and the number of turns of the coil 17 is further increased. The other features are similar to those described in connection with the foregoing embodiments, and, therefore, their explanation is omitted here.

Also, FIGS. 11a to 11e schematically illustrate other practical examples of the coil outline, where 17 denotes the effective area of the coil, and a circle of dashed line indicates an exposure aperture with its center at the center of rotation of the rotary member.

As has been described in detail above, one of the features of the present invention is that the coil is formed with eccentrically deformed turns relative to the center of swinging motion. Another feature is that the center of inertia of the transmission member for transmitting forward and backward motion of the coil to the diaphragm-cum-shutter blades is positioned opposite from the center of inertia of the coil with respect to the center of swinging motion. Therefore, the present invention has the advantage that the length of each turn of the coil can be shortened to permit a great increase in the number of turns of the coil while mintaining the condition of a constant electrical resistance. Therefore, even with a reduced number of magnet pieces, an electromagnetic force of sufficient magnitude can be exerted on the coil, and any unstability in swinging motion resulting from the eccentricity of the turns of the coil, can be avoided.

That is, according to the present invention, the bulk and size of the shutter can be reduced along with the number of magnets, and the reliability of operation thereof can be improved.

Though the embodiments of the invention have been described upon consideration of the inertia centers of the coil and transmission members to correct balance of these two members, such correction of balance may be otherwise established upon consideration of the centers of gravity of the coil and transmission members. It is to be also understood that the present invention is applicable to other types of electromagnetically driven shutters in which the coil is not fixed to the transmission member, for example, when the coil is moving forward, the coil engages the transmission member so that said transmission member drives the shutter blades to open.

What we claim:

1. An electromagnetically driven shutter assembly for a camera comprising:

shutter blade members adapted to be actuated to open and close a film exposure aperture in a camera;

magnets forming magnetic fields;

electrical coil means arranged in said magnetic fields adapted to be electrically energized for producing electromagnetic force; and a driving member connected with said shutter blade members adapted to rotate about a center of rotation in response to said electromagnetic force to actuate said shutter blade members;

said electrical coil means and said driving members each having, respectively, a center of inertia located eccentrically relative to said center of rotation on opposite sides thereof.

2. An assembly according to claim 1 wherein said electrical coil means are affixed with said driving member.

3. An assembly according to claim 1 wherein said electrical coil means are printed on said driving member.

4. An assembly according to claim 1 further comprising a biasing member urging said driving member to drive said shutter blade members in a direction to close said film exposure aperture, said biasing member being connected to said driving member at a point thereon on a side of said center of rotation opposite the side thereof where said center of inertia of said electrical coil means is located.

5. An assembly according to claim 1 wherein said driving member is formed with a shape which is generally symmetrical with respect to a line passing through said center of rotation.

6. An assembly according to claim 4 wherein said driving member is formed to be generally symmetrical with respect to a line passing through said center of rotation and wherein said driving member includes a connecting point located on said line having said biasing member connected thereto.

7. An assembly according to claim 3 further comprising a copper foil pattern printed on said driving member, said copper foil pattern being provided on said driving member on the side of said center of rotation opposite the side thereof on which said center of inertia of said electrical coil means is located, said copper foil operating to compensate for weight imbalance in said driving member.

8. An assembly according to claim 1 wherein said magnets are located on the same side of said center of rotation as said center of inertia of said electrical coil means.

9. An assembly according to claim 1 wherein said electrical coil means is printed on said driving member and includes coil portions extending relative to said magnets for producing said electromagnetic force, and connecting portions interconnecting at least some of said coil portions, said connecting portions being located on a side of said center of rotation opposite the side where said magnets are located and having an increased width so as to operate to increase the balance efficiency of said driving member while at the same time lowering the electrical resistance therethrough with increased conducting efficiency.

* * * * *